Feb. 2, 1937.   O. W. YOUNG   2,069,569
ANTIFRICTION BEARING
Filed Oct. 11, 1934

INVENTOR:
OTTO W. YOUNG,
BY
HIS ATTORNEY.

Patented Feb. 2, 1937

2,069,569

UNITED STATES PATENT OFFICE 2,069,569

ANTIFRICTION BEARING

Otto W. Young, East Orange, N. J., assignor to General Motors Corporation, Detroit, Mich., a corporation of Delaware Application October 11, 1934, Serial No. 747,902

4 Claims. (Cl. 308—212)

This invention relates to antifriction bearings and comprises all of the features of novelty herein disclosed. An object of the invention is to provide an improved roller bearing. Another object is to provide a self-contained roller bearing unit characterized by great simplicity and low cost.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a side elevation of the bearing with a portion of the race sleeve cut away.

Figure 1:
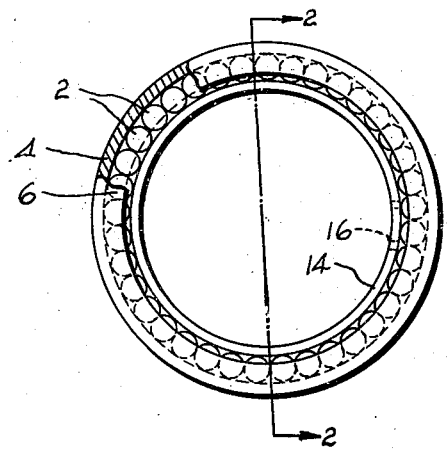
Figure 2:
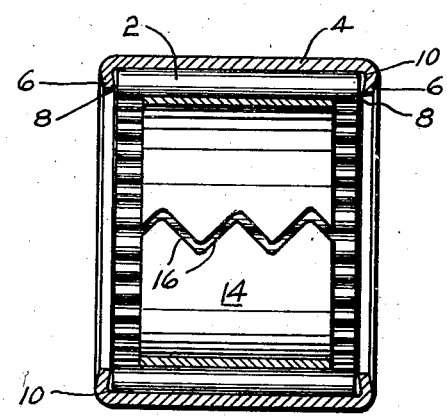

Fig. 2 is a sectional view taken on the line 2—2 of Fig. 1.

The rolling elements of the bearing preferably consist of a series of elongated cylinders 2 which are arranged in substantially a closed circle within an outer raceway sleeve 4. The rollers are conveniently and cheaply made from round stock chopped off to length, end ground, tumbled to break sharp corners, then hardened, and ground to size. The raceway sleeve 4 is preferably a die-drawn cylinder cut off to length and provided at the ends with turned-in end flanges 6. Each flange is bent or spun in at an angle greater than a right angle so that an annular terminal edge 8 will engage the flat ends of the rollers and keep the comparatively sharp corners of the rollers from digging into the sleeve, especially at the region 10 where the flange 6 joins the sleeve with a bend of small radius. The flanges 6 are substantially straight and their interior terminal edges are spaced apart a shorter distance than the bent portions of the sleeve where the latter joins the flanges. The bent portions of the sleeve are wholly beyond the ends of the rollers but close to such ends to make the sleeve as short as possible and thereby economize material. The flanges project from the sleeve a shorter distance than roller diameter so that they terminate opposite to the ends of the rollers to hold the rollers from endwise movement sufficient to encounter the bends. The rollers are held outwardly in the raceway sleeve for handling and shipment by an expansible spring member 14 preferably a cylindrical sleeve which is split along the zig-zag line 16 and is shorter than the rollers. Thus a self-contained bearing unit of great simplicity is produced and when assembled on a shaft or other inner raceway, the spring member 14 is easily pushed out axially along the rollers as the shaft is inserted.

I claim:

1. In a self-contained roller bearing unit, a series of rollers arranged in substantially a closed circle and terminating in flat end faces, a raceway sleeve of bendable metal engaging the rollers and having its opposite ends provided with substantially straight flanges integral therewith and bent at an angle greater than a right angle to the body of the sleeve to thereby engage the flat end faces of the rollers and hold them away from the bend, and means for holding the rollers in engagement with the sleeve, said means being slidable along the rollers; substantially as described.

2. In a self-contained roller bearing unit, a series of cylindrical rollers arranged in substantially a closed circle, an outer raceway sleeve of bendable metal surrounding the rollers and having its opposite ends turned inwardly beyond a right angle bend to guide the ends of the rollers and hold them from contact with the bend, an expansible spring member engaging the roller peripheries for holding the rollers outwardly against the inner surface of the sleeve, and the spring member being removable axially by sliding movement along the peripheries of the rollers; substantially as described.

3. In a self-contained bearing unit having a single race member and rolling elements for application to another race forming member, a series of substantially cylindrical rollers arranged in a circle, a sleeve of bendable metal having a straight raceway surface engaging the peripheries of the rollers, the sleeve having end portions bent at an angle greater than a right angle to the raceway surface to provide abutments engaging the roller ends to thereby keep the ends of the rollers from contact with said bends, and a removable resilient member engaging the rollers to hold them against the raceway, said resilient member being shorter than the rollers whereby application of a race forming member endwise into telescoping relation with the rollers will engage the end of the resilient member and slide the latter along the rollers and out of engagement therewith; substantially as described.

4. In a self-contained roller bearing unit, a series of rollers arranged in substantially a closed circle, a raceway sleeve of bendable metal engaging the peripheries of the rollers and having its opposite ends provided with substantially straight flanges integral therewith and bent at an angle somewhat greater than a right angle with respect to the body of the sleeve, the flanges thereby approaching one another and having their terminal edges spaced apart a shorter distance than the bent portions of the sleeve where the raceway surface joins the flanges, the bent portions of the sleeve being close to but wholly beyond the ends of the rollers, the flanges projecting from the sleeve a distance less than roller diameter to terminate opposite to the ends of the rollers and hold the rollers from moving endwise into contact with the bent portions of the sleeve, and means for holding the rollers against the sleeve; substantially as described.

OTTO W. YOUNG.